May 28, 1940.  F. G. DENNISON  2,201,991
APPARATUS FOR TREATING WORKPIECES
Filed Nov. 14, 1936  4 Sheets-Sheet 2
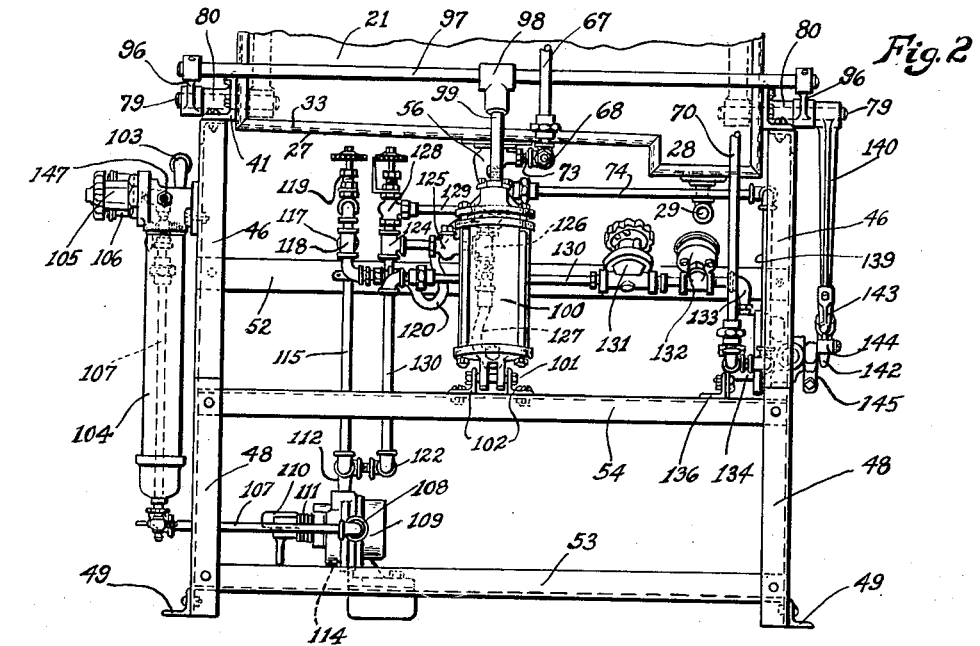
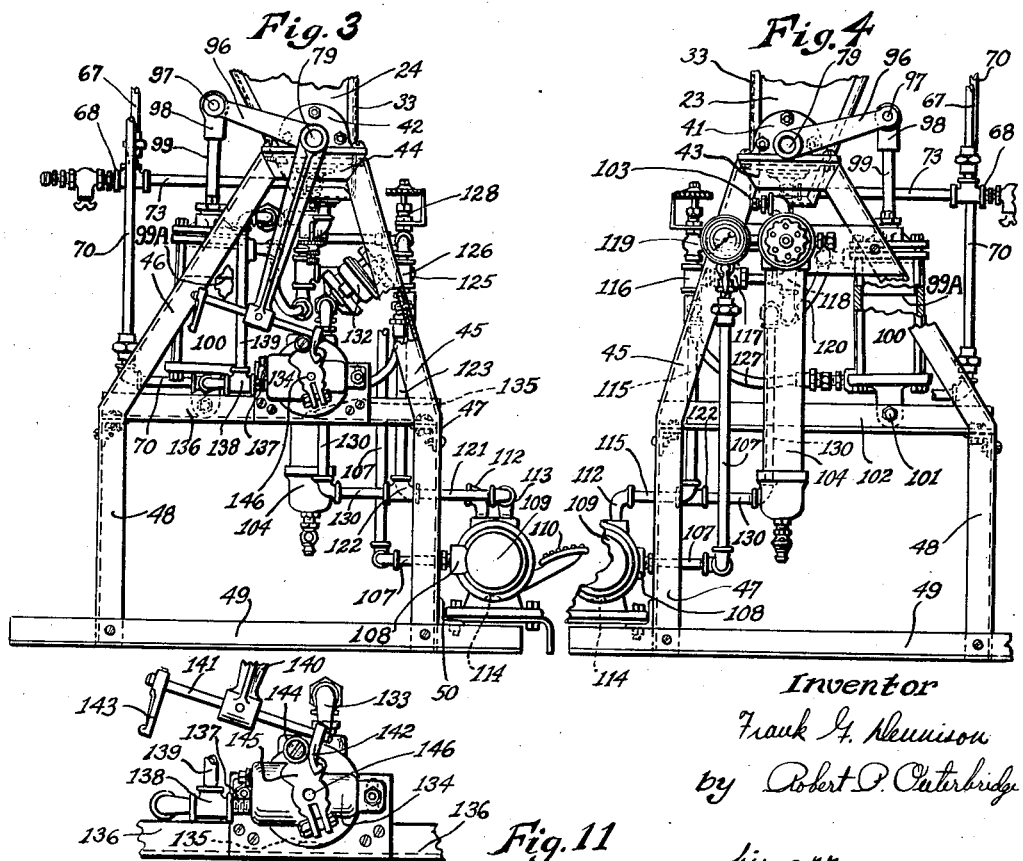
Inventor
Frank G. Dennison
by Robert P. Outerbridge
his attorney

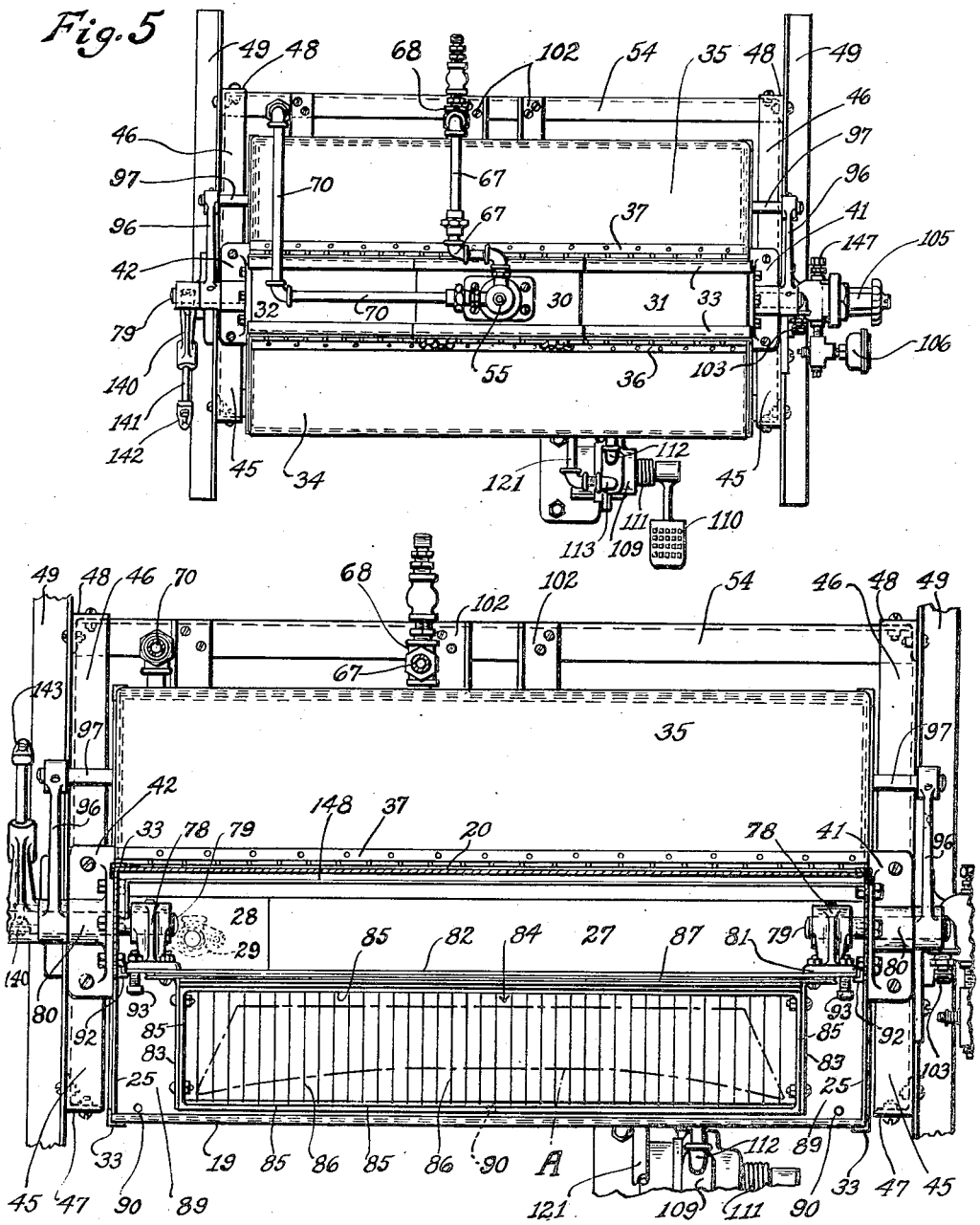

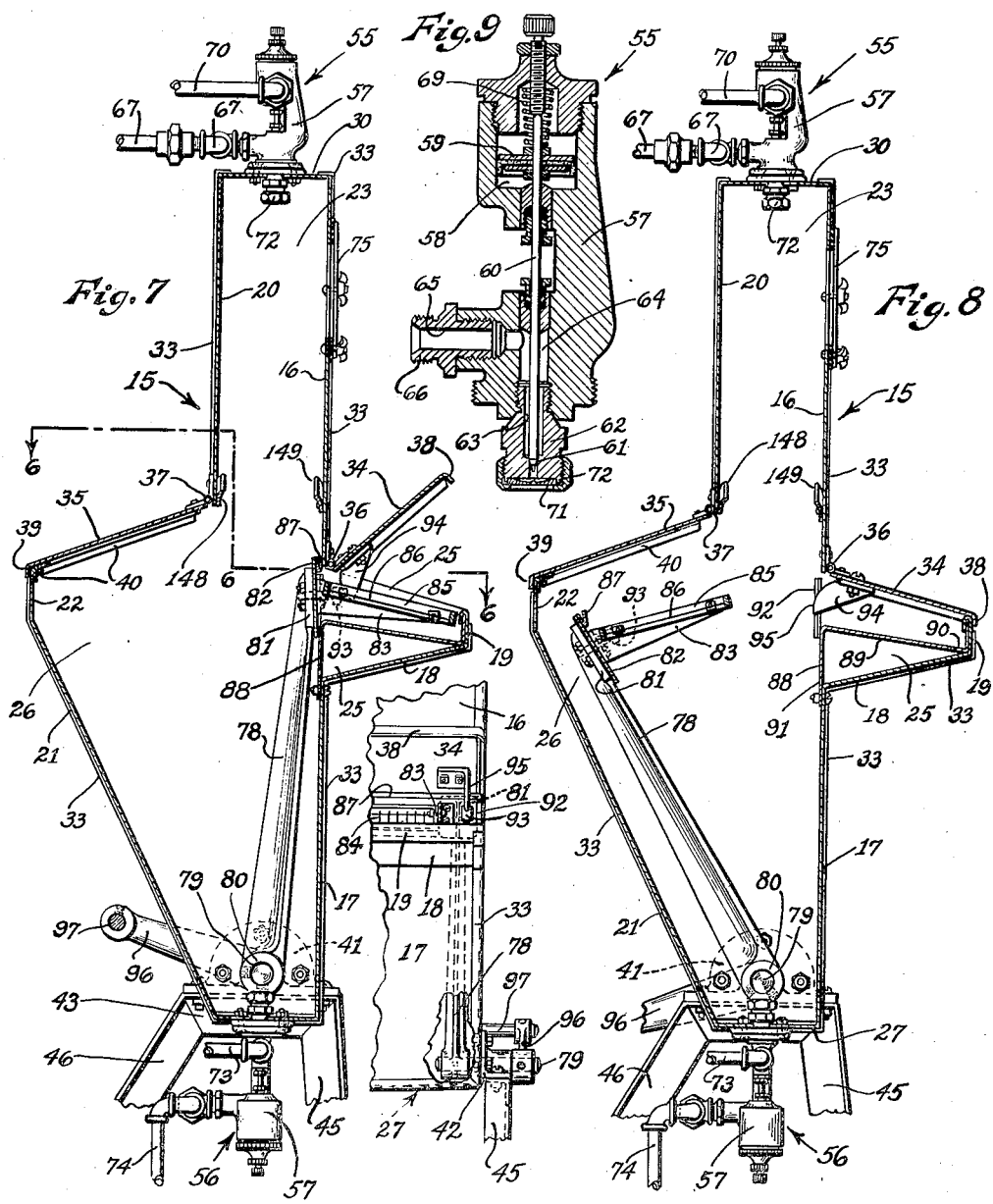

Patented May 28, 1940

2,201,991

UNITED STATES PATENT OFFICE 2,201,991

APPARATUS FOR TREATING WORKPIECES

Frank G. Dennison, Newtonville, Mass., assignor to Spray Engineering Company, Somerville, Mass., a corporation of Massachusetts Application November 14, 1936, Serial No. 110,906

16 Claims. (Cl. 91—44)

The present invention relates to the discharging of liquid upon workpieces, and more particularly to the discharging of liquid thereupon in the form of spray.

At the present time it is common in the manufacture of articles of clothing such as collars, cuffs, shirt fronts, or the like, to treat them in such manner that they have a stiffness lying in degree between that of the true soft collar, for example, on the one hand and that of the ordinary starched collar on the other.

The treating of these articles, collars being taken as an example which will be continued herein merely for purposes of illustration, may be accomplished by first causing the lining thereof to include in dry form a soluble substance having latent adhesive properties and by then supplying the collar, this is, the lining thereof, with a solvent treating material which dissolves the substance, causing it to spread between the inner and outer plies of the collar by capillary attraction. As the soluble substance has adhesive properties, the result of applying the solvent and then removing it, as by evaporation, is to cause the inner and outer plies of the collar to be bound adhesively together or to their lining. The treated collar is thus rendered relatively stiff, and since the soluble substance is not water-soluble, the collar may be laundered repeatedly without causing its stiffness to be diminished.

Heretofore it has been proposed to dip the collar into the solvent in order to effect treatment or to place the collar between layers of some material wet with the solvent and then to press the layers and thereby cause the solvent to soak through the collar plies and reach the soluble substance between them. Thereafter the treated article has been subjected to pressure and also to heat to unite the plies and to drive off the solvent, leaving the collar in a finished and stiffened condition. It has also been proposed to apply the solvent to the collar by a discharge in the form of spray.

An object of the present invention is to provide an apparatus by which the solvent-discharging method of treatment may be carried out. A further object of the present invention is to provide an apparatus which may be used not only to apply solvent to fabric constructions but also to apply treating liquid of any of various kinds to workpieces generally. This application of the liquid may be for the purpose of coating the workpieces or it may be for the purpose of impregnating them, as in the case of the collars, etc., noted above.

To the accomplishment of these objects and such others as may hereinafter appear, the various features of the present invention reside in certain constructions, combinations, and arrangements of parts fully described hereinafter and then pointed out broadly and in detail in the appended claims possessing advantages which will be readily apparent to those skilled in the art.

The various features of the present invention will be readily understood from inspection of the accompanying drawings, illustrating the best form of the invention at present known to the inventor, in which Figure 1 is a view in front elevation of my apparatus, the various moving parts being shown in the positions they occupy when the work carrier is at the rear of the chamber;

Fig. 2 is a slightly enlarged view in rear elevation of the lower portion of my apparatus, the various moving parts being shown in the positions they occupy when the work carrier is at the front of the chamber;

Fig. 3 is a slightly enlarged view in left side elevation of the lower portion of my apparatus, the various moving parts being shown in the positions they occupy when the work carrier is at the front of the chamber;

Fig. 4 is a slightly enlarged view in right side elevation of the lower portion of my apparatus, the various moving parts being shown in the positions they occupy when the work carrier is at the front of the chamber, except that the three-way valve and the trip therefor are not shown;

Fig. 5 is a view in plan of my apparatus as shown in Fig. 1;

Fig. 6 is an enlarged detail view in sectional plan taken generally along the line 6—6 of Fig. 7, the front door of the chamber not being shown;

Fig. 7 is an enlarged detail view in sectional elevation taken generally along the line 7—7 of Fig. 1, but showing the front door of the chamber raised and the work carrier at the front of the chamber;

Fig. 8 is an enlarged detail view in sectional elevation also taken generally along the line 7—7 of Fig. 1, showing the front door of the chamber closed and the work carrier at the rear of the chamber;

Fig. 9 is a view in sectional elevation of one type of liquid discharging means adapted for use with my apparatus, said view being taken along the line 9—9 of Fig. 1;

Fig. 10 is an enlarged detail view in front elevation showing the cam arrangement for elevating the front door of the chamber; and Fig. 11 is a detail view of the three-way valve and associated parts shown in Fig. 3, the underlying parts not being shown for sake of clarity.

Figure 1:
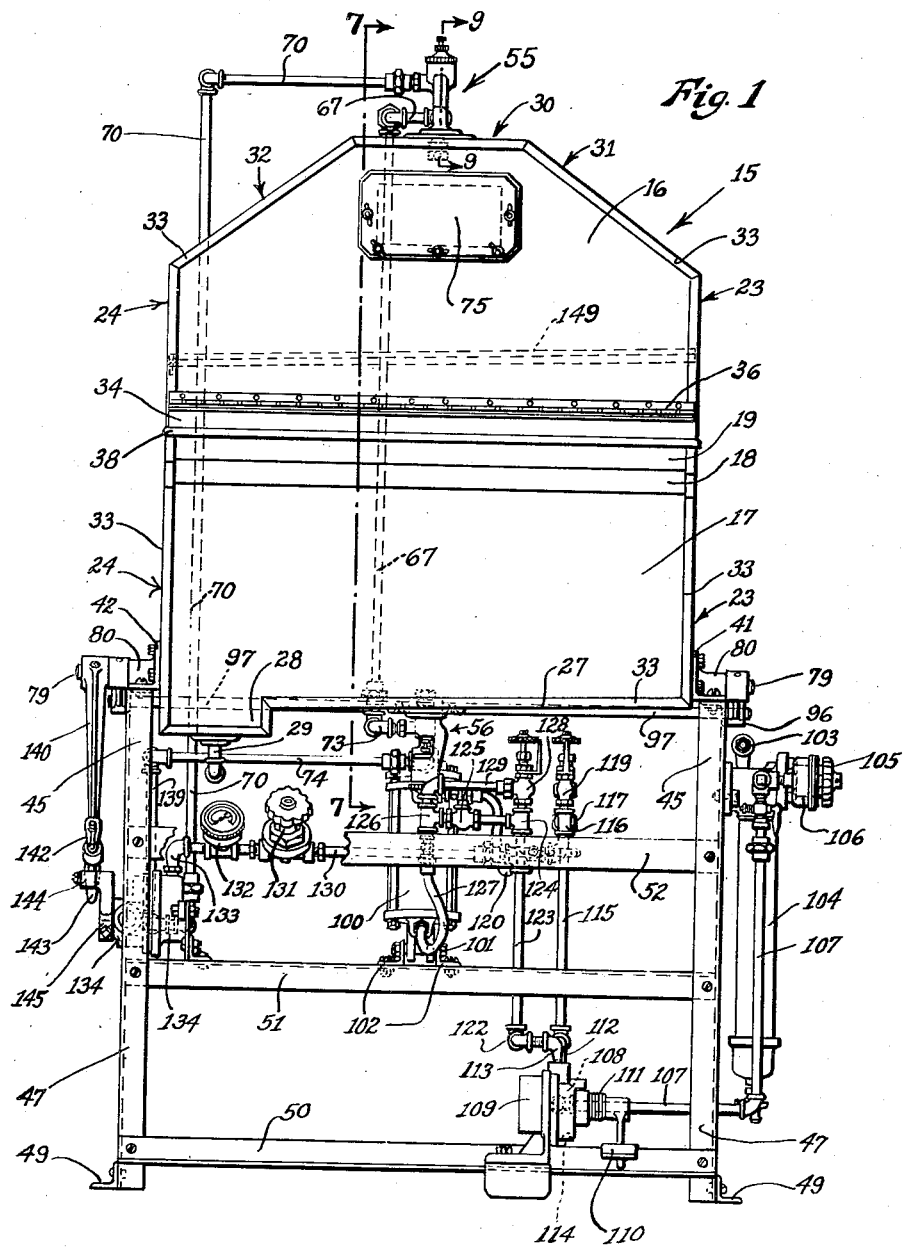

Referring to the drawings, the illustrated embodiment of the present invention is provided with a chamber 15 within which the work (such as the collar A in Fig. 6) is supported and treated. Describing the chamber 15 in detail, it is provided with a front comprising a vertically disposed upper wall 16 and a vertically disposed lower wall 17 spaced from the wall 16. The top of the lower wall 17, as shown particularly in Figs. 7 and 8, is provided with a forwardly and slightly upwardly extending shelf 18, the front end of which terminates in a vertical lip 19. The rear of the chamber 15 comprises a vertically disposed upper wall 20 and a rearwardly and upwardly disposed lower wall 21, the upper end of which terminates in a vertical lip 22. Joining the opposite sides of the wall portions forming the front and rear of the chamber 15 are vertically disposed side walls 23 and 24, the front of each of which terminates forwardly in an extension 25 to provide sides for the shelf 18 and its lip 19. The lower portions of each of the sides 23 and 24 also terminate rearwardly in an extension 26, and as will be seen in Figs. 7 and 8, the tops of the extensions 25 and 26 slope downwardly. The chamber 15 is also provided with a bottom 27 sloping downwardly to the left (viewing Fig. 1) and provided at its low end with a sump 28 at the bottom of which is a drain 29. The top of the chamber 15 comprises a horizontal central portion 30 and downwardly sloping side portions 31 and 32. The meeting edges of the above named parts may conveniently, though not necessarily, be provided with externally placed angle pieces 33 which insure that the chamber 15 does not leak and which hold the wall portions thereof together.

Completing the chamber are front and rear doors 34 and 35, respectively. Viewing Figs. 1, 7, and 8, the rear edge of the front door 34 and the lower edge of the wall 16 are joined by a hinge 36, and a similar hinge 37 joins the rear edge of the rear door 35 to the lower edge of the wall 20. Each of the doors 34 and 35 closes by gravity, the rear door being manually operated and being provided for access to the interior of the chamber 15. The front door 34 is automatically opened and closed as will be described in detail infra. As best shown in Figs. 7 and 8, the edges of the front door 34 are downwardly turned into a lip 38 for overlying the lip 19 and the tops of the extensions 25 when the door is closed, and the rear door 35 is similarly provided with a lip 39, adapted to overlie the lip 22 and the tops of the extensions 26. In addition, however, the rear door is provided with an inner lip 40 (Figs. 7 and 8) complementary to the lip 39 and spaced therefrom so as to form a channel into which the lip 22 fits.

It is intended that the above-described chamber 15 be suitably supported at a height sufficient to locate the front door 34 conveniently for an operator. To this end the illustrated embodiment of the present invention is provided with angle brackets 41 and 42 (Figs. 3, 4, 5, and 6 in particular) the vertical portions of which are secured to the bottoms of the side wall 23 and 24, respectively, and the horizontal portions of which rest on supports 43 and 44, respectively, extending from front to rear of the apparatus. The ends of the supports 43 and 44 are connected to downwardly and forwardly extending front arms 45 at each side of the apparatus and to downwardly and rearwardly extending rear arms 46 also at each side of the apparatus. The arms 45 and 46 are bent at their lower ends to form front and rear legs 47 and 48, respectively, which may in turn be secured to suitable feet 49. The supports 43 and 44 and associated parts may conveniently be of angle iron construction, as shown in the drawings. The above described supporting framework is rendered more rigid by angle iron braces 50, 51, and 52, (Fig. 1) extending between the front legs 47, and by angle iron braces 53 and 54 (Fig. 2) extending between the rear legs 48.

The above-described construction provides a supported chamber within which a workpiece such as the collar A in Fig. 6 may be received and treated. The mechanism for supporting the workpiece comprises a reciprocable carrier, and the apparatus for applying the liquid, such as solvent, to the workpiece comprises sprayers into and out of the path of discharge of which the carrier moves the work. The above-described chamber-supporting framework also serves to support the greater part of the apparatus for actuating the liquid discharging means and the carrier, and since discharge of liquid and carrier operation are tied up together to a great extent in the illustrated embodiment of the present invention, it has been deemed advisable for clarity of disclosure herein to describe first the means for discharging the liquid, then the carrier and its associated parts, and then the actuating means that controls them.

The present invention may be provided with any type of liquid discharging means suitable for the purpose, and I wish to be particularly understood as not meaning that the particular type disclosed is the only type that may be used. Referring to Figs. 1, 7, and 8, the illustrated embodiment of the present invention is provided with two sprayers, one sprayer, 55, being mounted in the top portion 30 of the chamber 15 and positioned to discharge in a vertical direction downwardly, and the other sprayer, 56, being mounted in the chamber bottom 27 and positioned to discharge in a vertical manner upwardly. Comparison of Fig. 1 with Figs. 7 and 8 will show that the discharge ends of the sprayers 55 and 56 are aligned, resulting in the discharge from each sprayer traveling in the general direction of the discharge from the other.

The sprayers 55 and 56 are alike, so that a description of one will serve as a description of both. Referring particularly to Fig. 9, the sprayer 55 comprises a body portion 57 the rear or upper end of which is provided with a chamber 58 in which a piston 59 is movable. Carried by the piston 59 is a needle 60 the forward end of which seats against a seat 61 formed in a nozzle 62 carried by the forward end of the body 57. The nozzle 62 is provided with an internal passage 63 communicating with a passage 64 formed in the forward portion of the body 57, and the body passage 64 communicates with a passage 65 formed in a nipple 66 carried by the body 57 laterally. The nipple 66 is connected by a conduit 67 (Figs. 1, 5, 7, and 8) to a T 68 (Figs. 3, 4, 5, and 6) which in turn may be connected to a suitable source of liquid supply (not shown) which is under pressure so that the sprayer 55 is always in readiness to discharge liquid upon a withdrawal of the needle 60 from its seat 61. The needle 60 is normally maintained seated on its seat 61 by a coil spring 69 (Fig. 9) which exerts pressure against the piston 59 in a needle-seating direction, and the needle 60 is withdrawn from its seat 61 by the pressure of a fluid such as compressed air from a suitable source (not shown) entering the gun body 57 through a conduit 70 (Figs. 5, 7, and 8), in a manner to be described, so as to drive the piston 59, and therefore the needle 60, back against the tension of the spring 69. The discharge end of the sprayer comprises a disc 71 of well known construction maintained on the nozzle 62 by means of a retainer 72, the disc 71 being constructed and positioned to discharge a fan-like spray extending substantially from one side of the chamber 15 to the other. Inasmuch as the construction of the sprayers 55 and 56 per se is not a part of the present invention and is in fact a well known construction, it is not deemed necessary to describe the sprayers further except to say that particularly in the case of solvents they are adapted to discharge a relatively coarse mist so as to minimize as much as possible any liquid loss resulting from the fact that the solvents used at the present time for treating the soluble substance carried by a workpiece are often highly volatile and are relatively expensive. It will be understood that where the illustrated embodiment of the present invention is used for some purpose other than impregnating a fabric workpiece with solvent, the character of the spray may be varied to suit particular conditions of use.

While the sprayer 56 has the same construction as the sprayer 55, it should be added that the sprayer 56 is supplied with liquid from a conduit 73 (best shown in Figs. 7 and 8) connected to the T 68 (Figs. 3 and 4) and that its piston chamber is supplied with compressed air from a conduit 74 (Fig. 2), as will be described in detail infra. For the purpose of mounting the sprayer 56 in the chamber bottom 27 or for the purpose of cleaning it, access to the bottom 27 interiorly of the chamber 15 can be gained by opening the rear door 35. To provide likewise for the sprayer 55, the front chamber wall 16 is provided with a removable door 75 (Figs. 1, 7, and 8).

Within the chamber 15 there is provided a work support or work carrier the function of which is to support the workpiece, such as the collar A in Fig. 6, and to move the supported work within the chamber and into and out of, that is, across, the path of the discharges of the sprayers 55 and 56. The carrier itself includes a pair of upwardly extending arms 78 (Figs. 6, 7, and 8) located at the opposite sides of the chamber 15 interiorly thereof, with the lower end of each arm 78 fast on a rock shaft 79 journaled in a hub 80 integral with a chamber-supporting bracket 41. The upper ends of the arms 78 are each provided with a forwardly disposed flat portion 81 (Figs. 6, 7, and 8) to which portions are secured the opposite ends, respectively, of a plate 82 extending substantially from one side of the chamber 15 to the other, as shown in Fig. 6. Projecting forwardly from each end of the plate 82 is a bracket 83 angularly disposed to its arm 78 so that when the arms 78 are in the position shown in Fig. 7, the brackets 83 lie below the tops of the forward side wall extensions 25.

The function of the brackets 83 is to receive and support the opposite ends of a tray 84 (Fig. 6) which is the portion of the carrier on which the collar A directly rests. Referring again to Figs. 6, 7, and 8, the tray 84 comprises a rectangular frame 85 to the long sides of which are connected, respectively, the opposite ends of a plurality of fine wires 86 which form the tray bottom. Referring to Figs. 7 and 8, it will be seen that the level of the bottom formed by the wires 86 is below top of the frame 85, thereby causing the upper portion of the frame to act as an abutment wall preventing the collar A from falling from the wires 86, that is, falling from the carrier, during the movement thereof.

It having been stated above that the function of the work carrier is to move the supported workpiece within the chamber and across the paths of the discharges from the sprayers 55 and 56, before describing the mechanism by which the work carrier is so moved, let it be further stated that the spraying operation occurs during the forward portion of the movement of the work carrier, that is, during its travel from the position shown in Fig. 8 to the position shown in Fig. 7. Inasmuch as the spray tends to fill the chamber 15, it will be seen that when the carrier has reached its Fig. 7 position, there will be fumes and spray adjacent the space between the front chamber walls 16 and 17, this space not being entirely closed off by the plate 82 and associated parts of the work carrier. Since the liquid may be relatively expensive and since the fumes therefrom may be disagreeable, it is desirable both to minimize the chance for spray and fumes to escape from the front of the chamber when the door 34 is open and to conserve the liquid as much as possible.

To this end the front of the top edge portion of the plate 82 is provided along its length with a bent strip 87 (Figs. 6, 7, 8, and 10) V-shaped in cross section. The position of this strip is best shown in Fig. 8, and the strip functions when the work carrier is in its Fig. 7 position, that is, forward, to engage the bottom of the chamber wall 16 and seal any space that may exist between said wall bottom and the top of the plate 82. The strip 87 (shown partially cut away on the ends, Fig. 6) is made of resilient material for this purpose, and by reason of its presence a fine adjustment of the forward swing of the work carrier is not necessary with respect to closing off the space between it and the bottom of the wall 16.

For a similar purpose the top of the chamber wall 17 is provided interiorly (Figs. 7 and 8) with an upstanding strip 88 extending along the length of the shelf 18. The strip 88 extends upwardly a little above the level of the bottom of the plate 82 so as to be engageable with it, and then is bent forwardly and downwardly into a lip 89, the forward edge of which rests on the shelf 18 adjacent its lip 19. The strip lip 89 serves as a sloping surface down which any drippings from the supported workpiece may flow, and is provided with a series of openings 90, shown in Fig. 6 as three in number merely for purposes of disclosure, through which the drippings may pass to the shelf 18. Since the shelf 18 slants rearwardly and downwardly the drippings will flow to the strip 88, and will then flow into the chamber 15 and to the sump 28 and the bottom 27 through a series of openings 91 (Fig. 8) formed in the strip 88, only one of said openings being shown. It will be seen that by reason of this construction, the space between the bottom of the plate 82 and the chamber wall 17 is effectively closed off, while provision is made for the draining back into the chamber 15 of drippings from the workpiece.

It will be appreciated, viewing Fig. 6, that the length of the plate 82 must be slightly less than the distance between the side extensions 25 associated with the shelf 18 in order that the work carrier may have freedom of movement over the shelf 18. At the same time, these spaces between the extensions 25 and the opposite ends of the plate 82 provide openings, as it were, through which the spray and fumes may pass when the work carrier is in its Fig. 7 position and the front door 34 is open. To prevent such fume and spray passage, the inner surfaces of the extensions 25 are provided with vertical angle pieces 92 (Figs. 6 and 8) which extend between the top of the strip 88 and the bottom of the chamber wall 16 to terminate just beneath the bottom level of the V-strip 87 and engage the ends of the plate 82 as shown in Fig. 6 to provide a substantial closure.

As a consequence, it will be seen that the spaces which would otherwise exist between the plate 82 on the one hand and the wall 16, the wall 17, and the extensions 25 on the other hand are closed off when the carrier is in its Fig. 7 position by the presence of the V-strip 87, the strip 88, and the angle pieces 92, respectively, thereby providing that the shelf 18 is in effect shut off from the interior of the chamber 15 so that spray and fumes in the latter are cut off from the former.

In the illustrated embodiment of the present invention the arms 78, in addition to functioning as portions of the work carrier, also function to open up the front door 34. Referring to Figs. 6, 7, 8, and 10, it will be seen that the flat portions 81 of the arms 78 are provided with cam studs 93, respectively, extending forwardly of the plate 82. Arranged in the path of travel of the cam studs 93 are brackets 94 carried at the opposite ends of the front door 34 within its lip 38 and having depending portions at the rear of each of which is a cam surface 95 adapted to be engaged with its associated cam stud 93. When the front door 34 is closed, as shown in Fig. 8, the work carried is spaced from the door 34 and the brackets 94 extend rearwardly. Upon movement of the carrier forwardly, however, and the engagement of the cam surfaces 95 by the cam studs 93, the brackets 94 are pushed forwardly, causing the front door 34 to swing upwardly on its hinge 36 into open position. As long as the carrier is in its Fig. 7 position, the front door 34 remains open, and upon withdrawal of the carrier to its Fig. 8 position, the retraction of the cam studs 93 results in the door 34 closing by gravity.

In order to cause the work carrier to undergo movement from its Fig. 7 position to its Fig. 8 position and back again, the ends of the rock shafts 79 exteriorly of the chamber 15 are made fast to arms 96 respectively, which extend rearwardly as indicated in Figs. 3, 4, 5, 6, 7, and 8. The rear ends of the arms 96 receive the opposite ends of a horizontal rod 97 (best shown in Fig. 2) extending from one side of the apparatus to the other. With this construction it will be seen that force applied to the rod 97 in a general upward or downward direction will cause the arms 96 to rock the rock shafts 79, and the rock shafts in turn will cause the work carrier within the chamber 15 to swing forwardly or rearwardly, as the case may be. In order to move the rod 97 to effect movement of the work carrier, the rod is provided intermediate its ends with a pivotally mounted T 98 (Figs. 2, 3, and 4) to which is secured the upper end of a piston rod 99 extending from the top of a double acting air cylinder 100 and connected to a piston 99A (Figs. 3 and 4) inside the cylinder. The cylinder 100 may have any one of a number of constructions now in commercial use, and except for certain remarks infra need not be further described except to say that it is supported pivotally on a bolt 101 mounted on angle irons 102 the opposite ends of which rest, respectively, on the frame braces 51 (Fig. 1) and 54 (Fig. 2), and that the stroke of the piston 99A is sufficiently long so that at the end of a piston movement the work carrier is at one side or the other, as the case may be, (Figs. 7 and 8) of the path taken by the spray discharge when the sprayers 55 and 56 are actuated.

It has been stated above that in the illustrated embodiment of the present invention the actuation of the liquid discharging means and the operation of the work carrier are tied up together to a great extent. The aforementioned means for effecting such actuation and operation will now be described, particular attention being called to Figs. 1, 2, 3, and 4 in this connection as these views show the front, rear, and sides of the apparatus where most of the parts in question are located.

Referring to Figs. 1, 2, and 4, compressed air from a suitable source (not shown) is first introduced into the apparatus by way of an inlet 103 at the top of an oil and water separator 104 which may be of standard and well known construction. From the separator 104 the compressed air flows into a pressure reducing valve 105 and from there into a pressure gauge 106, both the valve 105 and the gauge 106 being of any suitable and well known construction. Depending from the gauge 106 is a conduit 107 which is connected to the inlet 108 of a standard and well known four-way valve 109, preferably of the disc type. The four-way valve 109 is mounted on the brace 50 (Figs. 1 and 3) connecting the frame legs 47 and is provided with a foot pedal 110 associated with a spring return 111 in a well understood manner. As is usual in four-way valve constructions, the valve 109 is provided with two outlets 112 and 113 from which the compressed air, introduced into the apparatus by way of the separator inlet 103, flows as the valve 109 permits. The four-way valve is also provided with the usual exhaust port conventionally shown at 114.

Giving further attention to the outlet 112 of the four-way valve 109, the air flowing from this outlet passes into a conduit 115 (Figs. 1, 2, and 4) which extends upwardly into the lower branch of a T 116 (Fig. 4). The horizontal branch of the T 116 is connected to a check valve 117 which in turn is connected to the horizontal branch of a T 118 (Figs. 2 and 4). The upper branch of the T 116 is connected to a valve 119 (Fig. 4) having a suitable regulating hand wheel, and the valve 119 is connected to the upper branch of the T 118. The lower branch of the T 118 is connected to a flexible conduit 120 through which the air flows into the upper part of the air cylinder 100, that is, above the piston 99A contained therein. The function of the valve 119 will be explained infra, but the check valve 117 and its connection with the T 116 function, in effect, as a by-pass around the valve 119 so that when compressed air emits from the outlet 112 of the four-way valve 109 the flow of the air is as follows: conduit 115, T 116, check valve 117, T 118, and flexible conduit 120 into the top of the air cylinder 100.

Referring now to the outlet 113 of the four-way valve 109, from this outlet the compressed air flows into a conduit 121 leading into a T 122 (Figs. 3 and 4). From the upper branch of the T 122 the air flows into a conduit 123 (Figs. 1 and 3) which leads to a T 124 (Figs. 1 and 2).

The horizontal branch of the T 124 is connected to a check valve 125 which in turn is connected to the horizontal branch of a T 126 (Figs. 1 and 2), the lower branch of which is connected to a flexible conduit 127 leading into the bottom of the cylinder 100, that is, beneath the piston 99A contained therein. The upper branch of the T 124 is connected to a valve 128 having a suitable regulating hand wheel and connected by means of a conduit 129 (Figs. 1 and 2) to the upper branch of the T 126. The function of the valve 128 will be explained infra, but the check valve 125 and the T 124 function, in effect, as a bypass around the valve 128 so that when compressed air emits from the outlet 113 of the four-way valve 109, the flow of air is as follows: conduit 121, T 122, conduit 123, T 124, check valve 125, T 126, and flexible conduit 127 into the bottom of the air cylinder 100.

Referring again to the T 122 (Figs. 3 and 4) the horizontal branch thereof is connected to a conduit 130 (Figs. 1, 2, and 3) which leads into any suitable and well known pressure reducing valve 131 (Figs. 1 and 2). From the pressure reducing valve 131 the air flows into any suitable and well known pressure gauge 132, and from the gauge 132 to the inlet 133 of a three-way valve 134 (Figs. 1, 2, 3, and 11). Like the four-way valve 109, the three-way valve 134 (which may be a four-way valve with one outlet plugged) may be of standard and well known construction, is provided with the usual exhaust port 135, conventionally shown, and is supported from a brace 136 (Figs. 2, 3, and 11) the opposite ends of which are connected, respectively, to the front leg 47 and the rear leg 48 at the left side of the apparatus.

The three-way valve 134 is provided with an outlet 137 (Figs. 3 and 11) which is connected to a T 138 the horizontal branch of which is connected to the conduit 70 (Figs. 1, 2, and 3) leading to the piston chamber 58 of the sprayer 55. See Figs. 1, 7, 8, and 9. The upper branch of the T 138 is connected to a conduit 139 which in turn is connected to the conduit 74 leading to the piston chamber of the sprayer 56. See Figs. 1, 6, 7, and 8.

With this construction it will be seen that when air is supplied to the outlet 113 of the four-way valve 109, this air passes in part into the conduit 121 and the T 122 and so into the bottom of the cylinder 100 as explained above, and in part also passes into the three-way valve 134. From the outlet 137 of the three-way valve the flow of the compressed air is: T 138, conduit 70, and sprayer 55; and also T 138, conduit 139, conduit 74, and sprayer 56. As a consequence, whenever the three-way valve 134 is open to permit the flow from its outlet 137 of compressed air issuing from the outlet 113 of the four-way valve 109, the air will flow to the sprayers 55 and 56 and actuate them simultaneously. Stated in another way, this air emitting from the outlet 137 withdraws the pistons 59 (Fig. 9) of both the sprayers 55 and 56, thereby withdrawing their needles 60 from their seats 61 to cause an immediate discharge from the sprayers.

In order to open and close the three-way valve 134, that is, in order to cause compressed air to be discharged from the outlet 137 or to shut off the flow of the air therefrom, the left hand rock shaft 79 (Figs. 1, 5, and 6) is extended so as to receive fast thereon the upper end of a depending lever 140 (Figs. 1, 2, 3, 5, 6, and 11). The arms 78 (Figs. 7 and 8) and the lever 140 are so mounted on the rock shafts 79, respectively, that when the arms 78 swing forwardly, as shown in Fig. 7, the lever 140 swings rearwardly, as shown in Figs. 3 and 11, and that when the arms 78 swing rearwardly, as shown in Fig. 8, the lever 140 swings forwardly. Referring now particularly to Figs. 1, 3, and 11, the lower end of the lever 140 receives the middle portion of a rod 141 the opposite ends of which carry depending trip fingers 142 and 143, respectively, adjustably mounted thereon for movement toward and away from the center of the rod. The fingers 142 and 143 have sufficient length so that they may engage a roll 144 extending outwardly from the operating lever 145 of the three-way valve 134 (see Fig. 1) and by reason of their engagement with the roll 144 upon a swinging of the arm 140 the fingers 142 and 143 turn the lever 145 on its axis 146 (Figs. 3 and 11) so that the outlet 137 of the valve 134 is or is not supplied with compressed air, as the case may be.

Having described in the foregoing paragraphs the various conduits, valves, etc., through which the compressed air flows upon the supplying of air to the outlets 112 or 113 of the four-way valve 109, there will now be described the operation of the apparatus, that is, the results that occur when compressed air issues from these outlets upon actuation of the pedal 110.

Referring now to Figs. 3 and 7, which figures go together, they show the condition of the apparatus when the inlet 103 is connected to a supply of compressed air and all is in readiness either to place a workpiece on the tray 84 or to remove one therefrom. With the apparatus in the condition shown in Figs. 3 and 7, the work carrier is at the front of the chamber 15, that is, is at what may be called the first rest station of the carrier, and the cam studs 93 are pressing against the cam surfaces 95 of the brackets 94 to maintain the front door 34 open. Since the arms 78 have been rocked forwardly as shown in Fig. 7, the lever 140 has been rocked rearwardly, as shown in Fig. 3, and this in turn has caused the trip finger 142 (Figs. 3 and 11) to swing the lever 145 of the three-way valve 134 to the left, shutting off the supply of air to its outlet 137 but placing the outlet 137 in communication with the exhaust port 135. The pedal 110 of the four-way valve 109 is up, in which position the outlet 113 is in communication with the air supply while the exhaust port 114 is cut off from the outlet 113, and the outlet 112 is shut off from the air supply but is in communication with the exhaust port 114. Compressed air has flowed from the outlet 113 through the conduit 121, the T 122, the conduit 123, the T 124, the check valve 125, the T 126, and the flexible conduit 127, has entered the bottom of the air cylinder 100, and has pushed the piston 99A upwardly. The upward movement of the piston 99A has pushed the piston rod 99 upwardly, and this in turn has elevated the rod 97 and caused the arms 96 to swing upwardly, rocking the rock shafts 79 and causing the carrier arms 78 to swing forwardly as stated in the first part of this paragraph. But since the outlet 113 of the four-way valve 109 communicates with the T 122, compressed air has also flowed through the conduit 130, the pressure reducing valve 131, the pressure gauge 132, and the inlet 133 of the three-way valve 134. The outlet 137 of the three-way valve 134 is shut off, however, from the air supply as stated above, so that there is no discharge of air therefrom. The exhaust port 135 of the three-way valve 134 being open, any air that has been in the piston chambers 58 of the sprayers 55 and 56 (as will be explained) has been exhausted into the atmosphere.

When the pedal 110 is depressed, the various moving parts are actuated in the following manner: depression of the pedal 110 shuts off the supply of compressed air to the valve outlet 113 and places the outlet 112 in communication with the air supply. As a consequence, compressed air flows from the outlet 112 into the conduit 115, the T 116, the check valve 117, the T 118, and the flexible conduit 120, and enters the top of the cylinder 100, pushing the piston 99A downwardly. When the outlet 112 is in communication with the air supply, the exhaust port 114 of the four-way valve is in communication with the outlet 113 to exhaust the air that has previously entered the bottom of the cylinder 100. As a consequence when the air at the top of the cylinder 100 pushes the piston 99A downwardly, the air at the bottom of the cylinder takes the following backward course: the flexible conduit 127, the T 126, the conduit 129 (for the check valve 125 does not permit the passage of air therethrough), the valve 128, the T 124, the conduit 123, the T 122, the four-way valve outlet 113, and out the valve exhaust port 114. The function of the valve 128 is to regulate the speed with which the air is exhausted from the bottom of the cylinder 100, and it will be seen that regulation of the valve 128 by means of its hand wheel determines the speed of descent of the piston 99A in the cylinder 100 and therefore the speed of descent of the rod 97.

Since the air emitting from the valve outlet 112 enters the top of the cylinder 100 and pushes the piston 99A downwardly, as stated in the preceding paragraph, the downward movement of the piston pulls the rod 97 downwardly, and this in turn causes the arms 96 to rock downwardly. The result of the downward rocking of the arms 96 is twofold: the carrier arms 78 are rocked rearwardly, swinging the carrier to the position shown in Fig. 8, that is, to its second rest station; and the lever 140 is swung forwardly.

When the carrier arms 78 swing rearwardly, the cam studs 93 are withdrawn from the cam surfaces 95 of the brackets 94, and the front door 34 drops by gravity to closed position. Simultaneously with this movement the forward swinging of the arm 140 withdraws the trip finger 142 from the lever roll 144 of the closed three-way valve 134, and since the trip fingers 142 and 143 are spaced apart, during the greater part of the movement of the lever forwardly, the three-way valve 134 remains closed for its roll 144 is not engaged by either finger. Near the end of the forward movement of the lever 140, however, the trip finger 143 strikes the roll 144, swinging the valve lever 145 to the right, placing the outlet 137 of the three-way valve 134 in communication with the compressed air at the inlet 133, and closing the exhaust port 135.

With this operation it will be seen that the air previously passing beyond the pressure reducing valve 131 and trapped between it and the inlet 133 of the valve 134 when the pedal 110 was up, passes out the outlet 137 of the valve 134 and flows to the T 138, the conduits 70, 139, and 74, and the piston chambers 58 of the sprayers 55 and 56. This does not, however, move the pistons 59 to withdraw the needles 60 from their seats 61 and actuate the sprayers, since this trapped air is small in amount and necessarily undergoes a marked pressure drop, and the spring 69 (Fig. 9) is made strong enough to resist any effect on the pistons 59 of what pressure this air may have.

It will be appreciated that at the present-described stage of the operation of the illustrated embodiment of the present invention, the work carrier is at its second rest station, that is, has reached the end of its rearward swing as shown in Fig. 8 so that the tray 84 is to one side of the aligned sprayers 55 and 56, the three-way valve 134 is in such condition that any air which may enter its inlet 133 passes out the outlet 137, the pedal 110 is depressed, and the outlet 112 of the four-way valve 109 is in communication with the air supply, while the outlet 113 is shut off therefrom but communicates with the exhaust port 114.

When the pedal 110 is released, the outlet 113 of the four-way valve 109 is placed in communication with the air supply while the outlet 112 is shut off therefrom but communicates with the exhaust port 114. Compressed air flows through the apparatus as stated above to enter the bottom of the cylinder 100 and ultimately cause the forward swinging of the carrier arms 78 and the rearward swinging of the lever 140. Since the air entering the bottom of the cylinder 100 pushes the piston 99A upwardly, the air at the top thereof is exhausted along the following backward course: top of the cylinder 100, flexible conduit 120, T 118, valve 119 (for the check valve 117 does not permit the passage of air therethrough), T 116, conduit 115, the four-way valve outlet 112, and out of the valve exhaust port 114. In a manner similar to the valve 128, the function of the valve 119 is to regulate the speed with which the air is exhausted from the top of the cylinder 100, and it will be seen that regulation of the valve 119 by means of its hand wheel determines the speed of ascent of the piston 99A in the cylinder 100 and therefore the speed of ascent of the rod 97.

Since the carrier arms 78 swing forwardly to the first rest station when the depressed pedal 110 is released, the lever 140 swings rearwardly, thereby withdrawing the trip finger 143 from the now open three-way valve 134. The valve 134 thus remains open by reason of the spacing between the trip fingers 142 and 143, and since the outlet 113 of the four-way valve 109 is in communication with the air supply during this swinging of the lever 140 rearwardly, it will be seen that the air passing through the T 122, the conduit 130, the pressure reducing valve 131, and the pressure gauge 132, as stated above, enters the three-way valve 134 and passes out its outlet 137. As a consequence, this compressed air enters the T 138, and thereupon splits into two streams. Part of the air passes into the conduit 70 and so to the piston chamber 58 of the (upper) sprayer 55, and part of the air passes into the conduit 139, then into the conduit 74, and so into the piston chamber of the (lower) sprayer 56. Thus the sprayers 55 and 56 are actuated, that is, the pressure of the air in the piston chambers 58 pushes the pistons 59 against the tensions of their springs 69, thereby withdrawing the needles 60 from their seats 61 effecting the immediate spraying of the pressure driven liquid through the nozzles 62 and the discs 71. So long as the trip finger 142 remains spaced from the lever roll 144 of the three-way valve 134 during the rearward swing of the lever 140, it will be apparent that the discharge from the sprayers 55 and 56 continues. When, however, the trip finger 142 engages the lever roll 144, the lever 145 begins to turn, shutting off the air supply from the outlet 137 and causing the spray to cease. During this operation the exhaust port 135 is placed in communication with the outlet 137, permitting the exhaustion of the air remaining in the sprayer piston chambers 58, the conduits 70, 74, and 139, and the T 138. When this stage has been reached, the apparatus is once more in the condition shown in Figs. 3 and 7.

It will be noted in the above description that the sprayers 55 and 56 are not actuated while the work carrier is undergoing the rearward portion of its movement, that is, is travelling from the first rest station (Fig. 7) to the second rest station (Fig. 8), but that sprayer actuation occurs only while the work carrier is undergoing the forward portion of its movement, that is, is travelling from the second rest station to its first rest station. Stated in another way, sprayer actuation occurs in timed relationship to the beginning of the movement of the work carrier, that is, at the time during the movement of the work carrier when it is travelling forwardly and after it has travelled rearwardly. By providing that when the work carrier is at the end of the rearward portion of its movement, it is located out of the path taken by the sprays when the sprayers 55 and 56 are discharging, that is, to the left of that path as shown in Fig. 7, it will be seen that a short interval elapses between the time of actuation of the sprayers and the point in time when the work carrier moves the collar A into the path of the discharge. The purpose of this arrangement is to permit the sprays to become full bodied before they strike the collar, thereby insuring that all portions of the collar are treated.

Since the sprayers are not actuated when the trip finger 143 moves the lever 145 of the three-way valve 134 to the right (viewing Figs. 3 and 11) for the reason, as explained above, that the pressure of the air trapped between the pressure reducing valve 131 and the inlet 137 of the three-way valve 134 is not sufficient to push the pistons 59 against the tension of the springs 69, it will be seen that the trip finger 143 plays no part in the timing of the sprayers 55 and 56 other than to set the stage, as it were, by causing the outlet 137 of the three-way valve 134 to be in communication with the air supply. The trip finger 142, however, does have a timed relation effect upon the sprayers 55 and 56 in that it controls the moment during the forward movement of the work carrier when the sprayers are deactuated, that is, when the lever 145 turns so as to close off the supply of actuating air from the valve outlet 137. Viewing Fig. 8 in comparison with Fig. 7, and having regard to the different positions of the cam-surfaced brackets 94, it will be seen that when the work carrier has moved forward far enough so that the front door 34 is about half way open the greater portion of the tray 84 has passed the direct line of discharge of the sprayers 55 and 56, so that the supported work piece is substantially out of the direct line of spray discharge also. There thus being no further point in discharging the liquid, it is shut off, and this is effected by adjusting the position of the trip finger 142 on the rod 141 so that when the cam studs 93 have about half opened the front door 34, the trip finger 142 has moved the valve lever 145 sufficiently to the left so that the supply of air to the valve outlet 137 is cut off. As a consequence, it will be seen that the adjustment of the trip finger 142 on the rod 141 serves to deactuate the sprayers 55 and 56 in timed relationship to movement of the work carrier, specifically, at a point in time prior to the end of the travel thereof from the second rest station to the first.

The functioning of the pressure reducing valve 131 is closely tied up with the actuation of the three-way valve 134 by the trip fingers 142 and 143. The pressure reducing valve 105 functions to regulate the pressure of the air entering and flowing through the four-way valve 109 to the remainder of the connected parts of the apparatus, and is desirable because the initial pressure from the air source is generally too great for proper operation of the apparatus. But the pressure of the air admitted to the apparatus by the pressure reducing valve 105 may also be too great, even in its reduced state, to permit the easy actuation of the three-way valve 134 by the trip fingers 142 and 143 in the absence of some pressure-offsetting means. Stated in another way, the pressure of the air admitted to the inlet 133 of the three-way valve 134 is likely without corrective measures to be great enough to press the internal parts of the valve together with such force as to cause considerable friction, thereby offering undue resistance to the fingers 142 and 143 in their effort to swing the lever arm 145 of the valve. This resistance would put a strain on the fingers 142 and 143 and also on the lever arm 140, and would cause a slight lag in the timing of the operation of the three-way valve 134. By reducing the pressure of the air entering the three-way valve 134 by means of the pressure reducing valve 131, friction between the moving parts of the three-way valve is minimized, and the trip fingers 142 and 143 actuate the valve easily.

In the illustrated embodiment of the present invention as above described, it has been stated that the liquid supply (not shown) is under pressure. This pressure may come from an air compressor which has no other connection with the apparatus. It is preferred, however, that the source of the compressed air for placing the liquid under pressure be the same as that which enters the inlet 103 (Figs. 1, 2, 3, 5, and 6, actuates the sprayer pistons 59, and moves the work carrier forwardly and rearwardly as has been described above. To this end, the high side of the pressure reducing valve 105 may be provided with an outlet 147 (Figs. 2 and 5) to which a conduit (not shown) may be attached for connection with the pressure container for holding the liquid. This construction thus provides for a single source of compressed air, or a single outlet therefrom, and since the outlet 147 is on the high side of the pressure reducing valve 105, the pressure on the liquid, that is, the pressure which causes the liquid to be discharged from the sprayers 55 and 56 when their needles 60 are withdrawn, is not affected by either the pressure reducing valve 105 or the pressure reducing valve 131, but remains constant no matter what the adjustments of the pressure reducing valves 105 and 131 may be.

It has been pointed out above that when the sprayers 55 and 56 are actuated, the chamber 15 becomes filled with mist. It will be apparent that some of this mist will collect on the internal walls of the chamber along its height and will form free liquid which trickles down the walls. So far as the wall portions below the level of the tray 84 are concerned, this liquid trickling is of no moment, since it flows directly to the chamber bottom 27 and the sump 28 and cannot reach the workpiece. But the trickling of liquid down the walls of the chamber 15 from a point above the level of the tray 84 presents a different situation. It is intended that whether the workpiece be a fabric construction to be treated with a solvent or whether the workpiece be some other object to be either impregnated or coated, no drippings of free liquid shall strike it, but that it shall be treated only by the mist. To this end the inner surface of the chamber wall 20 is provided with a strip 148 (Figs. 6, 7, and 8) the upper portion of which is bent away from the wall to form a trough. The strip 148 slopes downwardly to the left, viewing the front of the chamber 15, and its low end is inturned as shown in Fig. 6 so as to lie more or less over the sump 28. In a similar manner the inner surface of the chamber wall 16 is provided with a strip 149 (Figs. 1, 7, and 8) like the strip 148, also sloping downwardly to the left (Fig. 1) and having its low end inturned. By reason of this construction the mist which collects as free liquid on the chamber walls 16 and 20 above the level of the tray 84 is caught by the strips 149 and 148, respectively, and is conveyed to the sump 28 so that there is no opportunity for free liquid drippings to strike the workpiece during the movement of the work carrier, and all the liquid which strikes the workpiece is in the form of spray. The value of this arrangement will be apparent in that it provides for a uniformity of distribution of the sprayed material on the workpiece.

In the operation of the illustrated embodiment of the present invention it will be seen that there are two stations at which the work carrier is at rest, the first of these stations being at the front of the chamber 15, at which time the pedal 110 is up, and the second of these stations being at the rear of the chamber 15, at which time the pedal 110 is depressed. When it is desired to treat workpieces, the inlet 103 is connected to a source of compressed air, and the apparatus assumes the condition shown in Figs. 3 and 7, the work carrier being at the first rest station. The operator supplies himself with workpieces, collars for example, and places one of them flatwise on the tray 84, as shown in Fig. 6, the front door 34 being open at this time. Thereupon the operator depresses the pedal 110 to cause the work carrier to move rearwardly towards the second rest station and to effect a closing of the door 34, and he keeps the pedal depressed until the work carrier is at rest at the second rest station and removed from the path of the sprays to be discharged from the sprayers 55 and 56. Then the operator removes his foot from the pedal 110, whereupon there occurs a discharge from the sprayers 55 and 56 and the beginning of the forward portion of the movement of the work carrier toward the first rest station and away from the second while the sprays are becoming full bodied. This movement of the work carrier continues, during which the spraying also continues so that the work carrier and the work supported thereby are moved into and across the path of the combined, full bodied sprays and the opposite faces of the workpiece are wetted. The bottom of the tray 84 is made up of the fine wires 86 so that the spray from the (lower) sprayer 56 strikes the under face of the workpiece directly substantially throughout its entire area. As a consequence, when the workpiece is moved through the combined sprays of the sprayers 55 and 56, the supported or under face of the work receives for absorption substantially as much of the treating material as does the upper surface of the work.

There then comes a time during the continued forward portion of the movement of the work carrier when the rearwardly moving trip finger 142, by reason of its adjusted position on the lever 141, turns the lever 145 to the left (Figs. 3 and 11) to shut off the supply of compressed air to the three-way valve outlet 137 so that the sprayers are deactuated. The forward portion of the movement of the work carrier then continues after sprayer deactuation, the V-strip 87 eventually striking the bottom of the chamber wall 16 and the plate 82 striking the strip 88 and the angle pieces 92 to close off the space between the front chamber walls 16 and 17. Also during the latter part of this movement of the work carrier, the cam studs 93 carried thereby engage the cam surfaces 95 of the brackets 94 and swing the front door 34 upwardly so that the door 34 is opened in timed relationship to the deactuation of the sprayers. When the work carrier reaches the end of the forward portion of its movement, the workpiece is immediately accessible to the operative in treated condition, at which time he removes it from the tray 84 and replaces it with another, depresses the pedal 110, and so begins again the cycle of operation of the apparatus.

The purpose of the spray in the illustrated use of the present invention being to wet the workpiece with liquid so that it soaks through the plies of the workpiece and dissolves the soluble substance therebetween, it will be apparent that it may be necessary to vary or regulate the length of time that the sprayers 55 and 56 are in operation depending upon the liquid absorbing properties of different types of fabric of which the workpieces may be made. To insure that fabrics of different kinds may all be treated properly on the illustrated embodiment of the present invention, the valve 119 may be regulated to vary the speed with which the piston 99A in the air cylinder 100 moves upwardly, for the slower this speed, the slower is the movement of the work carrier from the second rest station to the first, and by the same token the longer is the duration of the spray discharge against the workpiece moving through it.

Since the space between the front chamber walls 16 and 17 is closed off in the manner noted above, as the work carrier reaches the first rest station there is a minimum escape of spray and fumes through the open door 34, and by reason of the lip 89 on the strip 88, any drippings from the treated workpiece flow immediately back into the chamber 15 and to the sump 28. Inasmuch as some of the spray collects as free liquid on the inner surfaces of the walls of the chamber 15 and flows down them from a point above the level of the tray 84, the troughs formed by the strips 148 and 149 prevent the dropping of free liquid upon the supported workpiece and carry the liquid to the sump 28. Liquid collecting on the inner surfaces of the walls of the chamber 15 below the level of the tray 84 flows down the walls to the chamber bottom 27 and the sump 28, from which point the liquid may easily be removed from the chamber for re-use by opening the drain 29. As a further point in connection with the spray, since the chamber 15 becomes substantially filled with mist when the sprayers 55 and 56 are actuated, the escape of mist from around the edges of the rear door 35 is prevented by the channel formation of the lips 39 and 40 fitting over the lip 22.

Nothing herein explained is to be interpreted as limiting the present invention in the scope of its application to use in connection with the particular apparatus or the particular mode of operation or both selected for purposes of illustration and explanation. The sprayers 55 and 56 shown and described herein represent merely one type of discharging means that may be used, and their number and position may vary with the particular form of a given apparatus or the particular use to which it may be put. It will also be apparent that while the illustrated embodiment of the present invention provides for the discharge of spray only during the forward portion of the movement of the work carrier, it is within the scope of the present invention to have a spray discharge occurring during the rearward portion of the movement, or even during both, this latter arrangement thereby permitting the delivery of treated workpieces at each end of the chamber and the employment of two operators, one at the front and one at the rear of the apparatus, who alternately feed it with workpieces and remove treated workpieces therefrom. While the particulars of construction herein set forth are well suited to the mechanical form of the invention shown and to the use to which it is put, it is not limited to the details of construction shown nor to the conjoint use of all its features, nor is it to be understood that these particulars are essential since they may be variously modified within the skill of the artisan without departing from the true scope of the actual invention, characterizing features of which are pointed out in the following claims by the intentional use of generic terms and expressions inclusive of various modifications.

What is claimed as new is:

1. In an apparatus for treating workpieces, the combination with a reciprocable support for the work to be treated and means adapted to discharge treating material, said support normally positioning the work out of the path of the discharge of treating material, of means for reciprocating the support and for actuating the discharging means so that the supported work is brought into the discharge during at least a portion of the movement of the work support.

2. In an apparatus for treating workpieces, the combination with a chamber having a first rest station and a second rest station, a work support movable in the chamber, means adapted to discharge treating material in the chamber between said stations, and means for moving the work support from the first rest station to the second rest station, of means for moving the work support from the second rest station to the first rest station and for actuating the discharging means in timed relationship to the last-named movement of the work support.

3. In an apparatus for treating workpieces, the combination with a chamber, a reciprocable work support in the chamber, and stationary means adapted to discharge treating material in the chamber across the path of reciprocation of the work support during at least a portion of said reciprocation, of means for causing the work support to undergo reciprocation and for throwing the discharging means into and out of operation in timed relationship to the beginning and end of said reciprocation, respectively.

4. In an apparatus for treating workpieces, the combination with a chamber having a door, a work support reciprocable in the chamber toward and away from the door, means for reciprocating the work support, and means for discharging treating material in the chamber across the path of reciprocation of the work support, of means separate from the reciprocating means operating to open the door during a portion of the reciprocation of the work support.

5. In an apparatus for treating workpieces, the combination with a chamber having a door, a work support reciprocable in the chamber toward and away from the door, means adapted to discharge treating material in the chamber across the path of reciprocation of the work support, means for reciprocating the work support, and means for throwing the discharging means into and out of operation in timed relationship to the reciprocation of the work support, of means for opening the door in timed relationship to the deactuation of the discharging means and during the doorward movement of the work support.

6. In an apparatus for treating workpieces, the combination with a movable work support, a cylinder, a piston in the cylinder operatively connected to the work support, means adapted to discharge treating material, and means for moving the piston to cause the work support to move across the path of the discharge of treating material, of means for throwing the discharging means into operation in timed relationship to said movement of the work support.

7. In an apparatus for treating workpieces, the combination with a chamber, a work support reciprocable in the chamber, means adapted to discharge treating material in the chamber during at least a portion of the reciprocation of the work support, and fluid pressure controlled means for actuating the discharging means and for reciprocating the work support across the path of the discharge of treating material, of means for varying the speed of at least a portion of the reciprocation of the work support.

8. In an apparatus for treating workpieces, the combination with a chamber, a work support reciprocable in the chamber, means including a spray head mechanism for discharging treating material in the chamber, means for reciprocating the work support across the path of the discharge of treating material, and means located out of engageability with said spray head mechanism for actuating and deactuating the discharging means, of means for varying the duration of said actuation.

9. In an apparatus for treating workpieces, the combination with a chamber, reciprocable means for supporting a workpiece in the chamber, and means for reciprocating the work support, of means for depositing treating material on the opposite faces of the workpiece during at least a portion of the reciprocation of the work support, said supporting means being so constructed that the opposite faces of the workpiece receive substantially equal amounts of the treating material.

10. A treating device having, in combination, a reciprocable work support, means for reciprocating the work support, and means for spraying treating material against the opposite faces of the supported work during at least a portion of the reciprocation of the support, said work comprising a tray having a bottom sufficiently open to permit the passage of treating material therethrough into direct engagement with substantially the entire under surface of the supported work.

11. In an apparatus for treating workpieces, the combination with a chamber having a projecting portion provided with a door, and means for discharging treating material in the chamber, of means for shutting off said projecting portion from the remainder of the chamber to prevent the escape of material and fumes therefrom when the door is open.

12. In a spray chamber provided with a plurality of wall portions, the combination with means for spraying liquid into the chamber, a work support, and means for moving said work support through the spray and beneath at least one of said wall portions, of means for preventing free liquid formed on said wall portion from trickling down upon the work supported beneath said wall portion.

13. In an apparatus for treating workpieces, the combination with a reciprocable support for the work to be treated, and means adapted to discharge treating material, said support normally positioning the work out of the path of the discharge of treating material, of fluid pressure controlled means for actuating the discharging means and for reciprocating the work support across the path of the discharge.

14. In an apparatus for treating workpieces, the combination with a chamber, means for supporting a workpiece in the chamber, and means for moving the work support so that the workpiece is transferred from one locality in the chamber to a different locality, of means for discharging treating material against the opposite faces of the workpiece during its movement, said support being so constructed that the opposite faces of the workpiece receive substantially equal amounts of the treating material.

15. In an apparatus for treating workpieces, the combination with a work support reciprocable between a first rest station and a second rest station, means adapted to discharge treating material across the path of movement of the work support, and means for reciprocating the work support between said rest stations, of means for actuating the discharging means during at least a portion of the reciprocation of he work support.

16. In an apparatus for treating workpieces, the combination with a chamber, a work support reciprocable in the chamber, means adapted to discharge treating material in the chamber, means for reciprocating the work support across the path of the discharge of treating material, and means for actuating and deactuating the discharging means, of means for simultaneously varying the duration of said actuation and the speed of at least a portion of the reciprocation of the work support.

FRANK G. DENNISON.

CERTIFICATE OF CORRECTION.

Patent No. 2,201,991. May 28, 1940.

FRANK G. DENNISON.

It is hereby certified that error appears in the printed specification of the above numbered patent requiring correction as follows: Page 7, second column, line 49, after the numeral "6" and before the comma, insert the right-hand parenthesis mark -- ) --; page 9, second column, line 74, claim 10, after "work" insert --support--; page 10, second column, line 18, claim 15, for the word "he" read --the--; and that the said Letters Patent should be read with this correction therein that the same may conform to the record of the case in the Patent Office.

Signed and sealed this 2nd day of July, A. D. 1940.

(Seal)
Henry Van Arsdale,
Acting Commissioner of Patents.